United States Patent [19]

Lamb et al.

[11] 4,085,082

[45] * Apr. 18, 1978

[54] POLYMERS OF VINYL ACETATE PLASTICIZED WITH LOW MOLECULAR WEIGHT POLYESTERS

[75] Inventors: Frank Lamb, Oldham; Malcolm Combey, Mellor; Hugh Melvin Cooper, Cheadle, all of England

[73] Assignee: Ciba-Geigy AG, Basel, Switzerland

[*] Notice: The portion of the term of this patent subsequent to Feb. 28, 1995, has been disclaimed.

[21] Appl. No.: 602,889

[22] Filed: Aug. 7, 1975

Related U.S. Application Data

[63] Continuation-in-part of Ser. No. 406,175, Oct. 12, 1973, abandoned, which is a continuation-in-part of Ser. No. 192,625, Oct. 26, 1971, abandoned.

[30] Foreign Application Priority Data

Oct. 27, 1970 United Kingdom ............... 50906/70

[51] Int. Cl.$^2$ .......................... C08K 5/11; C08L 31/04

[52] U.S. Cl. .................................... 260/31.6; 560/198
[58] Field of Search ........................... 260/31.6, 485 G

[56] References Cited

U.S. PATENT DOCUMENTS

| | | | |
|---|---|---|---|
| 2,611,756 | 9/1952 | Pöckel .................................. | 260/31.6 |
| 3,086,044 | 4/1963 | Kerschner et al. ............... | 260/485 G |
| 3,149,087 | 9/1964 | Anagnostopoulos et al. ...... | 260/31.6 |
| 3,169,945 | 2/1965 | Hosteller et al. .................... | 260/31.6 |
| 3,250,738 | 5/1966 | Isaacs et al. ........................... | 260/31.6 |

FOREIGN PATENT DOCUMENTS

| | | | |
|---|---|---|---|
| 522,931 | 10/1953 | Belgium ............................... | 260/31.6 |
| 560,036 | 7/1958 | Canada ................................. | 260/31.6 |

*Primary Examiner*—Allan Lieberman
*Attorney, Agent, or Firm*—Wenderoth, Lind & Ponack

[57] ABSTRACT

Polyesters derived from the reaction of a dibasic acid, ethylene glycol and an aliphatic alcohol are used as plasticizers for vinyl acetate polymers.

5 Claims, No Drawings

POLYMERS OF VINYL ACETATE PLASTICIZED WITH LOW MOLECULAR WEIGHT POLYESTERS

This application is a Continuation-in-Part of copending application Ser. No. 406, 175, filed Oct. 12th 1973, now abandoned, which itself is a Continuation-in-Part of copending application Ser. No. 192, 625, filed Oct. 26, 1971, now abandoned.

According to the present invention there is provided a composition comprising a vinyl acetate polymer or copolymer and from 10% to 100% by weight based on the weight of the polymer of a polyester derived from the reaction of glutaric acid or anhydride or a mixture of dibasic acids or anhydrides selected from succinic, glutaric or adipic acid or anhydride with ethylene glycol and an aliphatic alcohol containing from 3 to 6 carbon atoms. The amount of polyester is preferably from 40% to 80% by weight based on the weight of the polymer. The polyester may be obtained by reacting the acid or acid anhydride with a glycol and an alcohol. A deficiency or excess of either or both of the glycol and alcohol may be used: where there is a deficiency of glycol this may be from 0 to 10 mole% below the theoretical amount and where there is a deficiency of alcohol, this may be from 0 to 50 mole% below the theoretical amount: where there is an excess of either or both glycol and alcohol this may be up to 20 mole% in excess of the theoretical amount.

The polyester may also be obtained by ester interchange as, for example, by heating a di-alkyl ester of a di-carboxylic acid with a glycol in the presence of a catalyst.

We have found, surprisingly, that the light transmission of compositions of vinyl acetate polymers or copolymers containing polyesters prepared from the dibasic acids or anhydrides described above is far superior to that of vinyl acetate polymers or copolymers containing polyesters prepared from succinic or adipic acid or anhydride.

The molecular weight of the polyester may conveniently be from 350 to 1500 but it is preferably from 500 to 1000.

A mixture of succinic, glutaric and adipic acids which is particularly preferred, is a commercially available mixture having the approximate composition by weight of 21% succinic acid, 45% glutaric acid and 34% adipic acid.

The aliphatic alcohol preferably contains from 4 to 6 carbon atoms.

The alcohol is preferably n-butyl alcohol or isobutyl alcohol. An example of a plasticiser which may be used is that derived from:

4 moles of a mixture of adipic, glutaric and succinic acids (with the approximate composition by weight 21% succinic, 45% glutaric and 34% adipic acids), 3.59 moles of ethylene glycol and 1.28 moles of iso-butanol.

The vinyl acetate polymer may be derived from the polymerisation of 100% vinyl acetate monomer or it may be a copolymer derived from the polymerisation of a mixture comprising between 55% and 100% of vinyl acetate, the remainder being one or more ethylenically unsaturated, non-halogenated co-monomers, for example a maleate, an acrylate, a methacrylate or ethylene. The maleates, acrylates and methacrylates may be the alkyl esters for instance the methyl esters. An example of the vinyl acetate polymer is the one sold under the Trade Mark "Vinamul 9800".

The present invention also provides a method for producing a plasticised vinyl acetate polymer or copolymer by adding the plasticiser to an emulsion of the polymer while stirring.

The plasticiser is conveniently added to the emulsion of the polymer and the mixture stirred vigorously using a Silverson homogeniser to obtain a free flowing dispersion.

Vinyl acetate polymers plasticised with the polyesters hereinbefore described may be used in surface coatings, fusible interlinings, adhesives, binders for fibres and non-woven fabrics, sizes for glass fibres, barrier coatings for bitumen-containing floor coverings, linoleum and leather finishes.

Vinyl acetate polymers plasticised in accordance with the present invention are superior to those plasticised with di-n-butyl phthalate which is the commonest plasticiser for polyvinyl acetate. For instance, the volatile loss is significantly less and there is an improvement in the solvent extraction resistance.

The following Examples further illustrate the present invention. Parts by weight shown therein bear the same relation to parts by volume as do kilograms to liters. Parts and percentages are expressed by weight.

EXAMPLE 1

(a) A polyester was prepared from 4 moles of a mixture of adipic, glutaric and succinic acid, (with the approximate composition 21% succinic, 45% glutaric and 34% adipic acids), 3.59 moles of ethylene glycol and 1.28 moles of isobutanol and having a molecular weight of 770, an acid value of 8.9 milligrams of potassium hydroxide per gram, a hydroxyl value of ·6 milligrams of potassium hydroxide per gram and a viscosity of 2436 centistokes at 25° C.

(b) 33 parts of the polyester prepared in Example 1(a) was added slowly to a mixture of 33 parts water and 100 parts of an emulsion of polyvinyl acetate containing 50 parts of polyvinylacetate. The emulsion was stirred vigorously in a Silverson homogeniser until a free flowing dispersion was obtained, which was cast at a wet film thickness of 0.020 inches onto a clean glass plate. After standing for 24 hours the cast film was assessed visually for clarity and was found to be very good.

Compositions with similarly good clarity are also obtained when the procedure of Example 1(b) is repeated except that instead of polyvinyl acetate the following copolymers are employed. The percentages are by weight:

(a) 90% vinyl acetate-10% ethylene
(b) 80% vinyl acetate-20% ethylene
(c) 60% vinyl acetate-40% dimethylmaleate
(d) 55% vinyl acetate-45% methyl acrylate
(e) 75% vinyl acetate-25% methylmethacrylate

EXAMPLES 2 and 3

Each of the polyesters shown in Table I were prepared from 4 moles of a mixture of adipic, glutaric and succinic acid (with the approximate composition 21% succinic, 45% glutaric and 34% adipic acids) together with the molar quantities of ethylene glycol and isobutanol denoted in the second column of the Table.

Each polyester was added to polyvinyl acetate as in Example 1b and the clarity was found to be very good.

TABLE I

| Example | Reactants | Acid Value mg KOH/g | Hydroxyl Value mg KOH/g | Viscosity cs at 25° C | Molecular Weight |
|---|---|---|---|---|---|
| 2 | Ethylene Glycol (4.1 moles) Iso-Butanol (1.16 moles) | 1.1 | 57 | 1307 | 750 |
| 3 | Ethylene Glycol (3.84 moles) Iso-Butanol (1.22 moles) | 5.7 | 28 | 2314 | 890 |

EXAMPLE 4

A polyester was prepared from 4 moles of glutaric anhydride, 3.76 moles of ethylene glycol and 1.28 moles of isobutanol and having a molecular weight of 850, an acid value of 1.5 milligrams potassium hydroxide per gram, a hydroxyl value of 25 milligrams of potassium hydroxide per gram and a viscosity of 1462 centistokes at 25° C.

This polyester was added to polyvinyl acetate as in Example 1b and the clarity was found to be very good.

Comparative Example

The film clarity/compatibility of polyvinyl acetate containing polyesters prepared by Examples 1 and 4 was compared with that of polyvinyl acetate containing a similar polyester but using adipic acid as the dicarboxylic acid (Polyester A). Each emulsion and film was prepared as in Example 1(b) and the clarity of the films measured as a percentage of light transmission was as follows:

| PLASTICISER | CLARITY % LIGHT TRANSMISSION |
|---|---|
| Polyester of Example 1 | 70 |
| Polyester of Example 4 | 69 |
| Polyester A | 3 |

Polyester A produced a film of poorer clarity indicating less compatibility with polyvinyl acetate than the polyesters of Examples 1 and 4 of the present invention.

We claim:

1. A composition comprising a vinyl acetate polymer or copolymer of between 55% and 100% of vinyl acetate with one or more ethylenically unsaturated non-halogenated comonomers and from 10 to 100% by weight based on the weight of the polymer of a polyester having a molecular weight of from 350 to 1500 derived from the reaction of glutaric acid or anhydride or a mixture of aliphatic dibasic acids of anhydrides selected from succinic, glutaric or adipic acid or anhydride with ethylene glycol and an aliphatic alcohol containing from 3 to 6 carbon atoms; wherein the alcohol and glycol components are reacted with the dibasic acids or anhydrides in the theoretical amounts needed to effect the reaction with the proviso that the glycol may be reacted with the dibasic acids or anhydrides in amounts ranging from 0–10 mol% below the theoretical amount necessary to effect the reaction to up to 20% in excess of the theoretical amount necessary to effect the reaction to up to 20% in excess of the theoretical amount and the alcohol may be reacted with the dibasic acids or anhydrides in amounts ranging from 0 to 50 mol% below the theoretical amount to up to 20 mol% in excess of the theoretical amount needed to produce the final product.

2. A composition according to claim 1 in which the acid from which the polyester is derived is a mixture of succinic, glutaric and adipic acids having the approximate composition by weight of 21% succinic, 45% glutaric and 34% adipic acids.

3. A composition according to claim 1 in which the alcohol from which the polyester is derived is n-butyl alcohol or iso-butyl alcohol.

4. A composition according to claim 1 in which the polyester is derived from 4 moles of a mixture of adipic, glutaric and succinic acids having the approximate composition by weight of 21% succinic, 45% glutaric and 34% adipic acids, 3.59 moles of ethylene glycol and 1.28 moles of iso-butanol.

5. A composition according to claim 1 in which the amount of polyester is from 40 to 80% by weight based on the weight of vinyl acetate polymer.